United States Patent
Yeung et al.

(10) Patent No.: US 10,853,147 B2
(45) Date of Patent: Dec. 1, 2020

(54) DYNAMIC PROCESSOR POWER MANAGEMENT

(71) Applicant: Microsoft Technology Licensing, LLC, Redmond, WA (US)

(72) Inventors: Andrew Z. Yeung, Redmond, WA (US); Glenn Evans, Kirkland, WA (US); Lucia Darsa, Clyde Hill, WA (US); Max McMullen, Seattle, WA (US); Steve Pronovost, Woodinville, WA (US); Jesse Natalie, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 122 days.

(21) Appl. No.: 15/993,231

(22) Filed: May 30, 2018

(65) Prior Publication Data
US 2019/0258528 A1 Aug. 22, 2019

Related U.S. Application Data

(60) Provisional application No. 62/632,938, filed on Feb. 20, 2018.

(51) Int. Cl.
*G06F 9/50* (2006.01)
*G06F 11/30* (2006.01)
*G06F 11/34* (2006.01)
*G06F 9/48* (2006.01)

(52) U.S. Cl.
CPC .......... *G06F 9/5083* (2013.01); *G06F 9/4887* (2013.01); *G06F 9/4893* (2013.01); *G06F 11/3024* (2013.01); *G06F 11/3414* (2013.01)

(58) Field of Classification Search
None
See application file for complete search history.

(56) References Cited

U.S. PATENT DOCUMENTS

2012/0102348 A1* 4/2012 Muralidhar .......... G06F 1/3287
713/323
2013/0166750 A1 6/2013 Moon et al.
(Continued)

FOREIGN PATENT DOCUMENTS

GB 2395309 A 5/2004
WO 2014052826 A1 4/2014
(Continued)

OTHER PUBLICATIONS

Etinski, et al., "Optimizing job performance under a given power constraint in HPC centers", In Proceedings of International Conference on Green Computing, Aug. 15, 2010, 11 Pages.
(Continued)

*Primary Examiner* — Eric C Wai
(74) *Attorney, Agent, or Firm* — Holzer Patel Drennan

(57) ABSTRACT

The described technology addresses one or more of the foregoing problems by receiving one or more workloads from an application. Each of the one or more graphics workloads are associated with completion deadline information and execution metadata representing execution guidance for the workload. The described technology further generates a processor performance adjustment for each of the one or more workloads using a performance model providing the processor performance adjustment based on the completion deadline information and the execution metadata for each of the one or more workloads. The described technology further communicates each of the one or more received workloads and its corresponding generated processor performance adjustment to a processor subsystem. Each of the processor performance adjustments instructs the processor subsystem on a processor adjustment to be implemented when executing the associated workload.

22 Claims, 8 Drawing Sheets

(56) References Cited

U.S. PATENT DOCUMENTS

| | | | |
|---|---|---|---|
| 2016/0357241 A1 | 12/2016 | Ramadoss et al. | |
| 2017/0061568 A1* | 3/2017 | Metz | G06F 1/3206 |
| 2017/0322612 A1 | 11/2017 | Beuchat et al. | |
| 2018/0137668 A1 | 5/2018 | Mercati et al. | |

FOREIGN PATENT DOCUMENTS

| | | |
|---|---|---|
| WO | 2014082094 A1 | 5/2014 |
| WO | 2015163864 A1 | 10/2015 |

OTHER PUBLICATIONS

Hugue, et al., "Guarantee Task Deadlines for Fault-Tolerant Workloads With Conditional Blanche", In Journal of Real-Time Systems, vol. 3, Issue 3, Sep. 1, 1991, pp. 275-305.

Kim, et al., "Performance Comparison of Dynamic Voltage Scaling Algorithms for Hard Real-time Systems", In Proceedings of Eighth IEEE Real-Time and Embedded Technology and Applications Symposium, Sep. 24, 2002, 10 Pages.

Okuma, et al., "Real-Time Task Scheduling for a Variable Voltage Processor", In Proceedings of 12th International Symposium on System Synthesis, Nov. 10, 1999, pp. 24-29.

"International Search Report and Written Opinion Issued in PCT Application No. PCT/US19/016944", dated May 27, 2019, 13 Pages.

Salehi, et al., "Dynamic Voltage and Frequency Scheduling for Embedded Processors Considering Power/Performance Tradeoffs", In Proceedings of IEEE Transactions on Very Large Scale Integration Systems, vol. 19, Issue 10, Aug. 9, 2010, pp. 1931-1935.

"PerfEnergyPreference", Retrieved From docs.microsoft.com/en-us/windows-hardware/customize/power-settings/options-for-perf-state-engine-perfenergypreference, May 10, 2017, 2 pages.

* cited by examiner

DYNAMIC PROCESSOR POWER MANAGEMENT

CROSS-REFERENCE TO RELATED APPLICATIONS

The present application claims benefit of priority to U.S. Provisional Patent Application No. 62/632,938, entitled "Dynamic Processor Power Management" and filed on Feb. 20, 2018, which is specifically incorporated by reference herein for all that it discloses and teaches.

BACKGROUND

Power management in computing devices presents challenges relating to the types of workloads, individual hardware and software components, various interfaces, and industry standards. Different power management systems work well for a particular type of workload, software component, or hardware component while working less well in other circumstances. Various tradeoffs exist in power management for central processor units (CPUs), graphics processing units (GPUs), microcontrollers, and other hardware components. In particular, existing graphic processor unit (GPU) power management systems and related standards are insufficient to meet the needs of certain graphics payload signatures.

SUMMARY

The described technology addresses one or more of the foregoing problems by receiving one or more workloads from an application. Each of the one or more workloads are associated with completion deadline information and execution metadata representing execution guidance for the workload. The described technology further generates a processor performance adjustment for each of the one or more workloads using a performance model providing the processor performance adjustment based on the completion deadline information and the execution metadata for each of the one or more workloads. The described technology also communicates each of the one or more received workloads and its corresponding generated processor performance adjustment to a processor subsystem. Each of the processor performance adjustments instructs the processor subsystem on a processor adjustment to be implemented when executing the associated workload.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
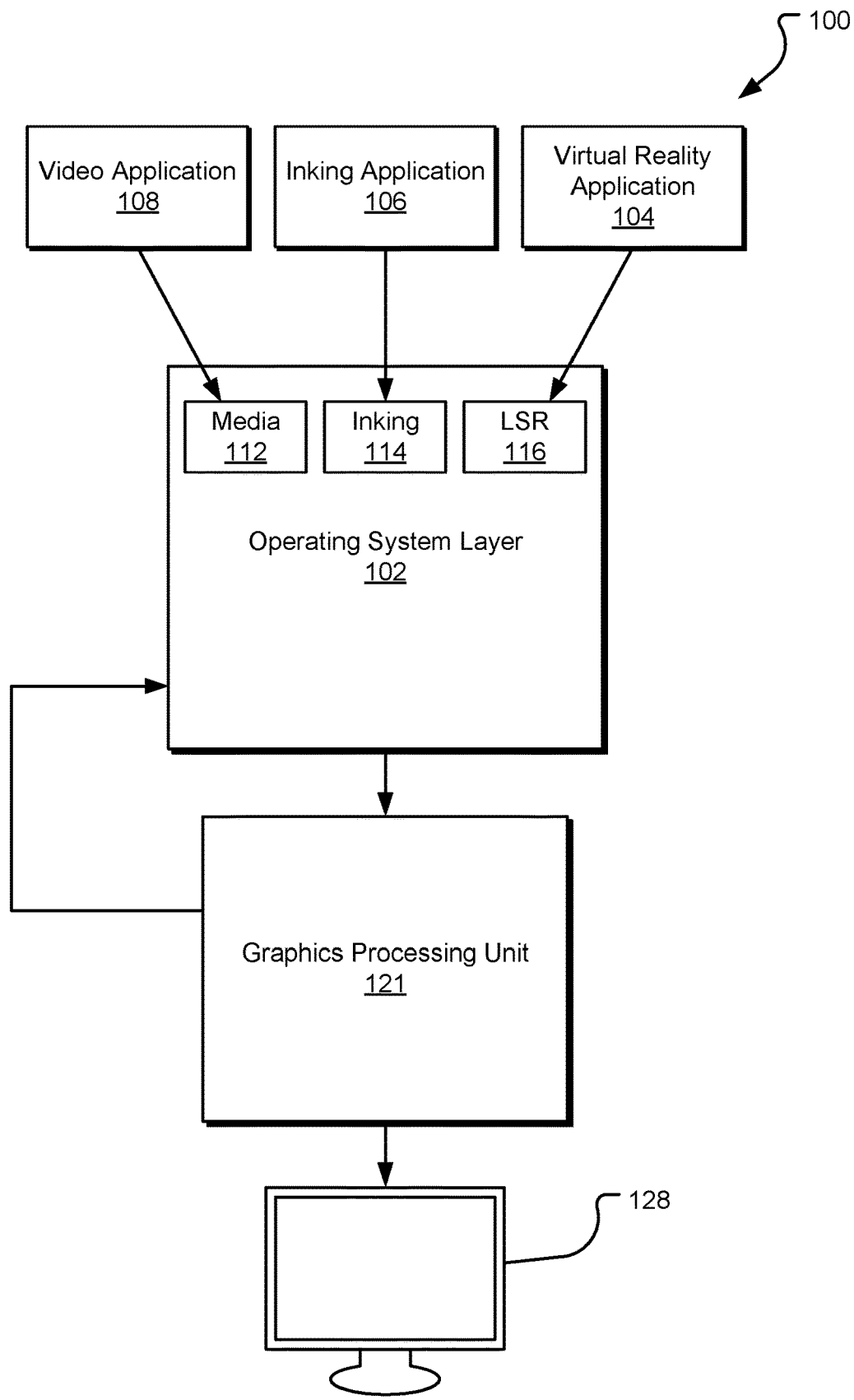
FIG. 1 illustrates an example system for dynamic processor power management.

FIG. 1 illustrates an example system 100 for dynamic processor power management. An operating system layer 102 receives graphics workloads from applications (e.g., a virtual reality application 104, an inking application 106, and a video application 108) through application programming interfaces (APIs) (e.g., a media API 112, an inking API 114, and a late stage reprojection (LSR) API 116). The operating system layer 102 then passes the graphics workloads to a graphics processing unit (GPU) 121. The GPU 121 executes the graphics workloads to render graphics to be displayed on a display device 128.

Though the description focuses on graphics processing, a similar system may be used for other types of processors. For example, dynamic processor power management may be used to manage processor power for a central processing unit (CPU), an application-specific instruction set processor (ASIP), a physics processing unit (PPU), a digital signal processor (DSP), or any other type of processor that may be present in a computing device.

To correctly display graphics on the display device 128, the GPU 121 executes the graphics workloads in accordance with deadlines corresponding to the graphics workloads. The GPU 121 operates at a higher frequency to execute graphics workloads more quickly. However, when operating at a higher frequency, the GPU 121 uses more power. The GPU 121 may adjust its operating frequency to save power. Without the disclosed dynamic processor power management, the GPU 121 operating frequencies are managed by software. This may result in missing deadlines or a lagging operating frequency adjustment which may waste power.

With the disclosed dynamic processor power management, applications 104, 106, and 108 and the operating system layer 102 may provide guidance to the GPU 121 so that the GPU 121 may make better informed decisions about the frequency selected to execute a graphics workload. By providing the GPU 121 with frequency guidance and by tracking completion of workload deadlines, the GPU 121 may adjust its operating frequency to optimize power while meeting more completion deadlines, leading to completing work on time.

Dynamic processor power management balances performance with energy consumption in a computing device by allowing the operating system layer 102 to suggest an operating frequency to the GPU 121 for executing a graphics workload. The suggested operating frequency suggested by the operating system layer 102 is a processor performance adjustment. In some implementations, the processor performance adjustment is a percentage by which the operating system layer 102 suggests that the GPU 121 either increase or decrease its operating frequency. In other implementations, the processor performance adjustment is an energy performance level (EPL). An EPL is an integer between 0 and 100, where 0 indicates that the GPU 121 should optimize its frequency for energy savings (lowest frequency) and where 100 indicates that the processor should optimize its frequency for speed and performance (highest frequency). When the GPU 121 receives the processor performance adjustment from the operating system layer 102, the GPU translates the processor performance adjustment to a corresponding operating frequency. In other implementations, the processor performance adjustment may be an adjustment to another variable affecting processor performance.

The processor performance adjustment is generated based in part on completion deadline information and execution metadata received with the graphics workload. The execution metadata represents execution guidance for the workload. In some implementations, the execution metadata is an intent tag. The intent tag represents a performance intent for the graphics workload. In some implementations, the completion deadline information may be a completion deadline, which is when the graphic workload should be completed for optimal graphics display on the display device 128. In other implementations, the completion deadline information may be a start time for the graphics workload and an estimated amount of processing time for the graphics workload.

The intent tag received with the graphics workload indicates a performance intent for the graphics workload. A performance intent provides guidelines about the power needed to process the graphics workload, the payload signature of the graphics workload, or the context of the graphics workload. A payload signature of a graphics workload may be, for example, information indicating that the graphics workload is a short burst payload, a periodic payload, or a power saving payload.

The context of the graphics workload provides additional information for estimating the correct frequency to execute the graphics workload correctly and by a given deadline. In some implementations, other performance factors may be adjusted according to a processor performance adjustment, including without limitation as the memory speed, signal bandwidth, and workload allocation to different processor cores. In other implementations, a processor performance adjustment may provoke a reordering of work to optimize power saving (or another parameter) while executing a given workload. In still other implementations, a processor performance adjustment may refer to a property proportional to performance or power.

The context may vary based on the type of graphics workload. For example, one context may indicate that the graphics workload is video playback. For video playback, one objective is to provide a glitch-free experience while minimizing energy consumption. For example, frames are decoded well in advance, and the system knows when the decoded frames will be used in each stage of the pipeline. Another context may indicate that the graphics workload is late stage reprojection (LSR). For LSR, there is usually a clear deadline to be met with a minimal amount of power usage and without unnecessary power spikes. Another context may indicate that the graphics workload is super-wet inking. For super-wet inking, there is a very close deadline to be met for the most responsive user experience. This means that the execution of a super-wet inking graphics workload generally begins very close to the deadline and is executed quickly to meet the deadline.

The operating system layer 102 may make different suggested processor performance adjustments based on context information. For example, the operating system layer 102 may suggest that the GPU 121 minimize power when a task does not need to be completed quickly. For example, video playback often does not need to be completed quickly initially. Alternatively, for a context such as super-wet inking that has a close deadline, the operating system layer 102 may adjust the suggested processor performance adjustment to allow the GPU 121 to execute the graphics workload quickly without wasting excess power. Further, the contexts may allow for reorganization of the execution of tasks to satisfy deadlines while minimizing power consumption.

Although power management can be applied to various types of processing units, the description herein focuses on GPU power management. Nevertheless, the described technology may be applied to other types of processing units, for example in coordinating interaction between a GPU and a CPU.

Figure 2:
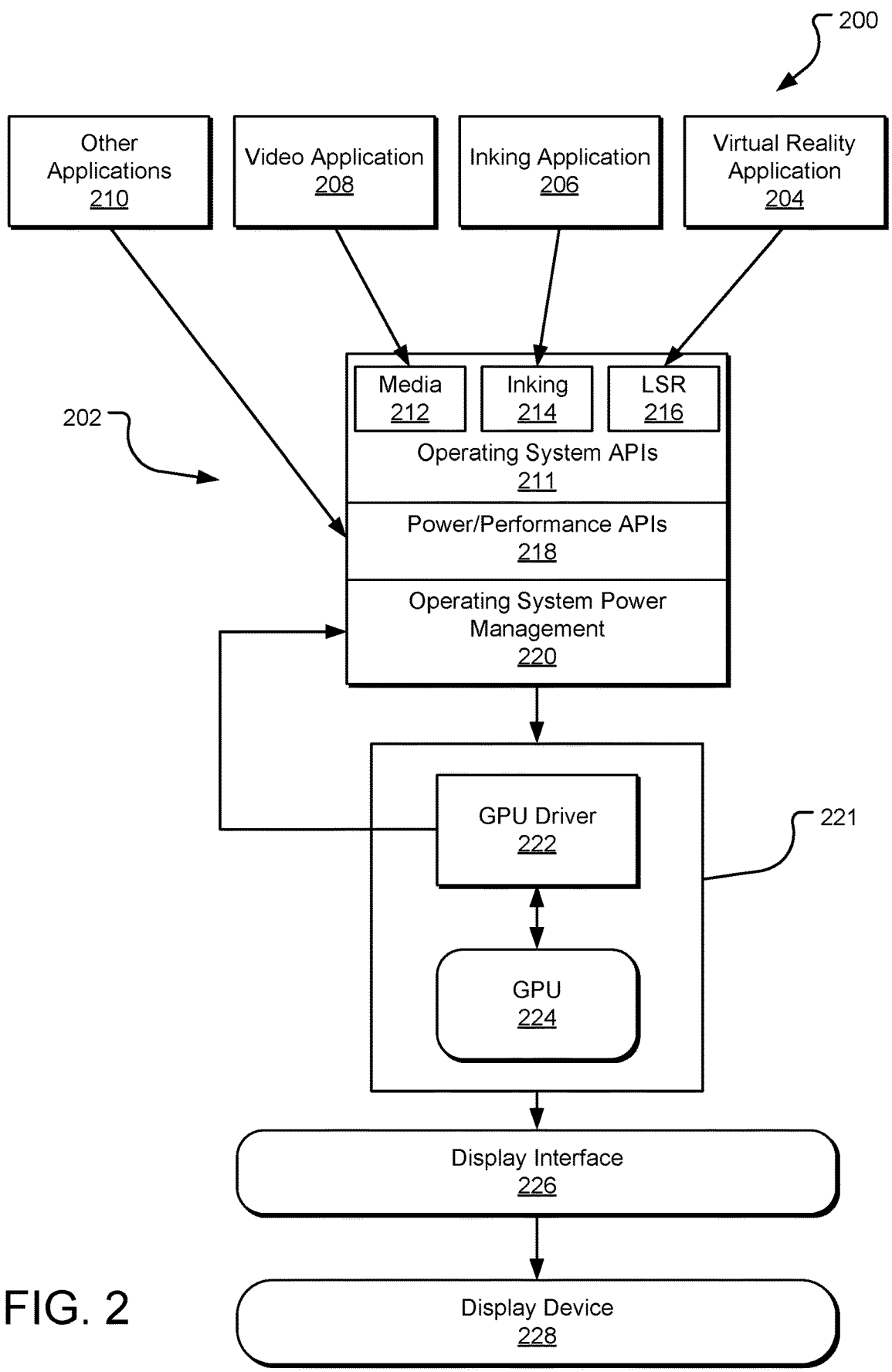
FIG. 2 illustrates another example system for dynamic processor power management.

FIG. 2 illustrates another example system 200 for dynamic processor power management. An operating system layer 202 manages dynamic processor power management between applications, such as a virtual reality application 204, an inking application 206, a video application 208, and other applications 210. The operating system layer 202 provides specialized operating system APIs 211 (e.g., a media API 212, an inking API 214, and an LSR API 216) between the individual applications and a power and performance API layer 218, which provides an interface to the operating system power management layer 220. Through these specialized APIs, the applications may provide a workload completion deadline (e.g., a time by which the application expects the GPU to complete the provided workload) and an intent tag or annotation for each graphics workload to signify to the power and performance API layer 218 that a workload is to be tracked for dynamic processor power management according to a power/performance intent for each workload. The other applications 210 that do not support a specialized operating system API can communicate directly to the power/performance APIs 218.

The operating system power management layer 220 submits tagged (e.g., tracked) graphics workloads and untagged (e.g., untracked) graphics workloads to a processor subsystem 221, which includes a processor (e.g., a GPU 224) and a processor software driver (e.g., GPU driver 222), for processing. Tagged graphics workloads are graphics workloads received with associated intent tags. The operating system power management layer 220 also submits for tracked graphics workloads one or more processor performance adjustments. The processor performance adjustments may be instructions to increase or decrease power and performance operation by the GPU 224 (e.g., by instructing an increase or decrease in the frequencies of one or more GPU component engines in the GPU 224). In one implementation, such hints are in the form of a proposed percentage increase in a frequency. In another implementation, such hints are in the form of an adjustment to an EPL submitted to the GPU 224.

In some implementations, the processor performance adjustments may be further based on workload prioritization metadata received with each tracked graphics workload. Workload prioritization metadata may be helpful when more than one tracked workload is submitted the GPU 224 to be executed at the same time. The workload prioritization metadata may provide an adjusted execution order for individual graphics workloads. This means that the operating system power management layer 220 may provide the GPU 224 with a preferred execution order for the tracked graphics workloads based on the workload prioritization metadata. The preferred execution order may affect the processor performance adjustment. For example, if several graphics workloads are to be executed by the GPU 224 simultaneously, the processor performance adjustment may instruct the GPU to operate at a higher frequency than it would if just one graphics workload was being executed at a time.

The operating system power management layer 220 records the submission time for future tuning of the processor power management. The GPU driver 222 submits the workloads to the GPU 224, monitoring and saving the workload processing start and completion times, returning these times to the operating system power management layer 220. The operating system power management layer 220 can use this information to process each workload with more performance (e.g., "high speed") or better power efficiency.

Given the submission times, start times, completion times, completion deadlines, and intent tags of many workloads over time, the operating system power management layer 220 can develop a model of workload performance through the processor subsystem 221. For example, evaluating the workload completion times against the application-provided completion deadlines, the likelihood that the processor subsystem 221 will complete the workload on time can be determined. Based on this likelihood, the operating system power management layer 220 can provide iterative guidance to the processor subsystem 221 to increase or decrease internal hardware engine frequencies to better satisfy the completion deadlines. The iterative guidance may take the form of additional processor performance adjustments.

Further, the processor performance adjustment can be influenced by the intent tags. For example, if the intent tag specifies high speed, then the processor performance adjustment can quickly instruct the processor subsystem 221 to increase its frequencies, to at least the point at which the completion deadlines are being met for similarly-tagged workloads. In contrast, if the intent tag specifies power efficiency, then the processor performance adjustment can instruct the processor subsystem 221 to decrease its frequencies, to at least short of the point at which the completion deadlines are not being met. In the case of an intent tag specifying periodic, then the processor performance adjustment can evaluate the temporal relationships among submitted workloads and periodically expected workloads to smooth out dramatic oscillations between high speed frequencies and power efficient frequencies.

As part of a calibration operation, the GPU may be raised to a maximum performance level to allow the calculation (or estimation) of the workload execution time, which can be used to modify or encode various parameters sent to the driver or processor. For example, from this, the starting deadline can be estimated from the completion deadline. Further, in another example, an 'approaching' deadline can be included to construct a ramp up schedule to mitigate the excessive power consumption from frequent deadline misses. Other examples are contemplated.

In some implementations, a "start deadline" may be used as an alternative or an addition to a "completion deadline." For example, an application may specify a "start deadline" and, from that, determine a "completion deadline" as the "start deadline" plus a workload duration (e.g., a time period that the workload is expected to take to complete execution). Various such deadlines can be used to determine whether the processor performance is great enough to satisfy certain performance objectives for the workload. The use of "deadline" in the remainder of the specification may refer to a completion deadline or a start deadline. Further, concepts applying to a completion deadline may also apply to a start deadline.

In the case of a graphics processor, the resulting output (e.g., video frames, virtual reality frames, inking display changes) may be output to a display device 228 through a display interface 226. Other output interfaces and devices may also be employed (e.g., decoded audio from an audio processor). In some implementations, the output may not be displayed.

Figure 3:
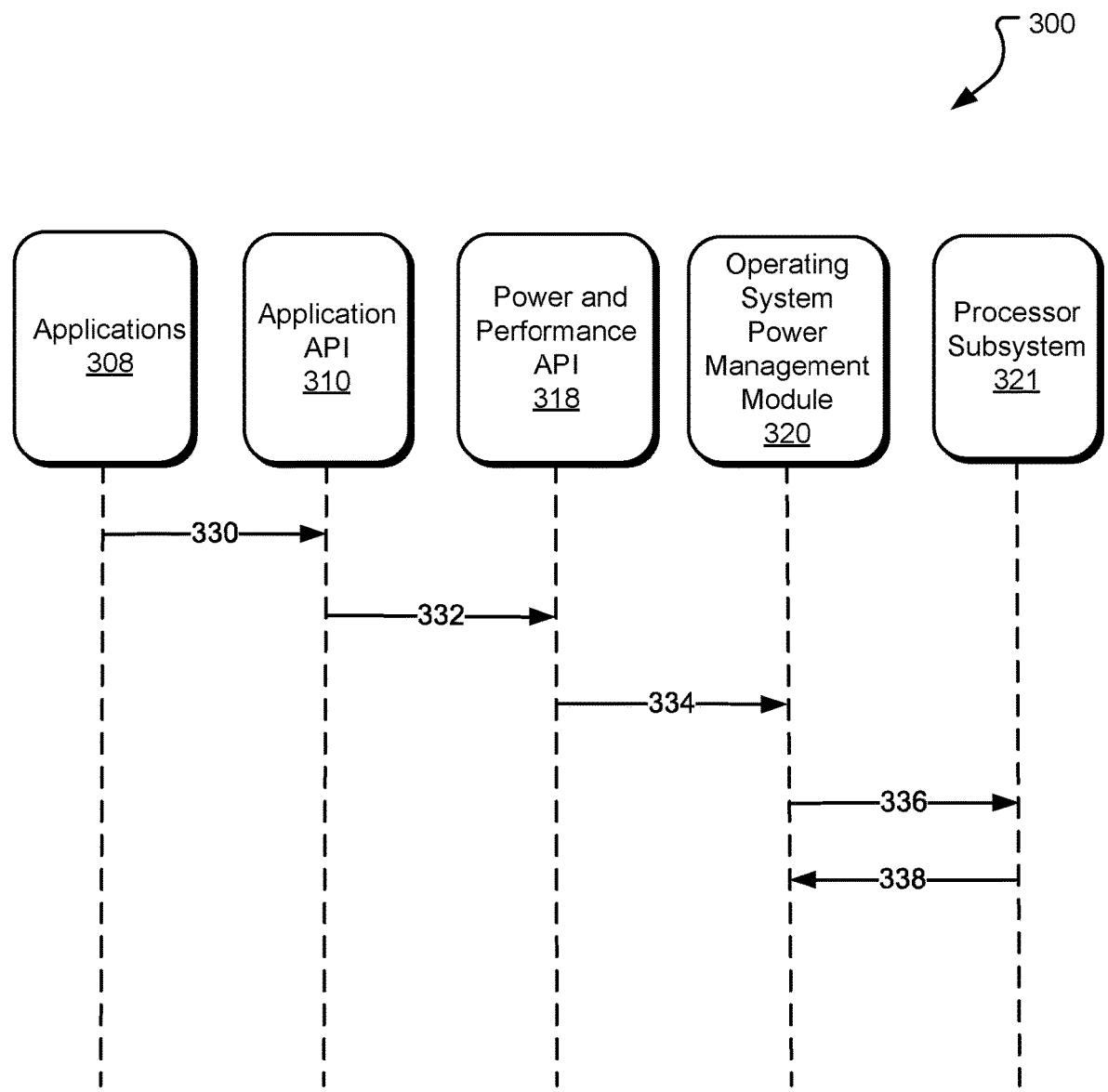
FIG. 3 illustrates example communications in dynamic processor power management.

FIG. 3 illustrates example communications 300 in dynamic processor power management. In a communication 330, an application 308 communicates a graphics workload, completion deadline information, and an intent tag to an application API 310. An operating system layer of a computing device may include multiple APIs specific to applications that communicate graphics workloads to be executed by a processor subsystem. Accordingly, the application API 310 may be the one of the multiple APIs on the operating system of the computing device that corresponds to the application 308 communicating the graphics workload, completion deadline information, and the intent tag to the application API 310.

The graphics workload is a graphics processing task to be executed by the processor subsystem 321. Completion deadline information may be information used to calculate a completion deadline for execution of the graphics workload. In some implementations, the completion deadline information is the completion deadline itself. In other implementations, the completion deadline information may be, for example, an execution start time and an estimated elapsed execution time for the graphics workload.

The intent tag indicates a performance intent for the graphics workload. A performance intent provides guidelines about the power needed to process the graphics workload, the payload signature of the graphics workload, or the context of the graphics workload. A payload signature of a graphics workload may be, for example, information indicating that the graphics workload is a short burst payload, a periodic payload, or a power saving payload.

In a communication 332, the application API 310 communicates the graphics workload, completion deadline information, and the intent tag to a power and performance API 318. The power and performance API 318 evaluates received graphics workloads to determine whether each graphics workload has an associated intent tag. Graphics workloads with associated intent tags are communicated to an operating system power management module 320. In some implementations, an application may communicate a graphics workload, completion deadline information, and an intent tag directly to the power and performance API 318. The application may communicate directly with the power and performance API 318 when the application does not have a corresponding application API 310.

In a communication 334, the power and performance API 318 communicates the graphics workload, completion deadline information, and the intent tag to the operating system power management module 320. The operating system power management module 320 then generates a processor performance adjustment for the graphics workload using a performance model to estimate an appropriate processor performance adjustment based on the completion deadline information and the intent tag received with the graphics workload. In one implementation, the performance model is a table including processor performance adjustments corresponding to a variety of combinations of intent tags and completion deadline information. By looking up the combination of the received intent tag and the received deadline information, the operating system power management module 320 may generate an appropriate processor performance adjustment. In other implementations, the performance model may be, for example, a formula used to generate a processor performance adjustment based on the received intent tag and the received completion deadline information.

In some implementations, the completion deadline information is a completion deadline for the associated graphics workload. In other implementations, the completion deadline information may be, for example, an execution start time and an estimated elapsed execution time for the graphics workload. When the completion deadline information is not the completion deadline, the operating system power management module 320 may calculate the completion deadline from the received completion deadline information.

In a communication 336, the operating system power management module 320 communicates the generated processor performance adjustment and the graphics workload to the processor subsystem 321. In one implementation, the processor subsystem 321 is a GPU. The processor subsystem 321 then uses the processor performance adjustment to adjust the operating frequency of the processor subsystem during the execution of the graphics workload. The operating system power management module 320 also communicates the completion deadline to the processor subsystem 321 during the communication 336.

The processor subsystem 321 executes the graphics workload using the adjusted operating frequency suggested by the processor performance adjustment. In some implementations, when the processor subsystem 321 is executing multiple graphics workloads simultaneously, a scheduler may reschedule graphics workloads to ensure that the graphics workloads are executed by their corresponding completion deadlines. The scheduler may also adjust the operating frequency for the simultaneous execution of multiple graphics workloads.

The processor subsystem 321 also tracks the completion deadline for the graphics workload and the time when execution of the graphics workload was completed by the processor subsystem 321. In a communication 338, the processor subsystem 321 returns the completion deadline, the actual time of completion, and the operating frequency used to execute the graphics workload to the operating system power management module 320. The operating system power management module 320 may use the received completion deadline and the actual time of completion, along with the operating frequency used to execute the graphics workload to update the performance model. If, for example, the actual time of completion of the graphics workload was a after the completion deadline, the performance model for the intent tag and completion deadline information corresponding to the graphics workload may be updated to suggest a higher operating frequency so that the completion deadline is not missed for a subsequent graphics workload with the same intent tag and completion deadline information. Over time, the performance model becomes more accurate at predicting an appropriate operating frequency for the processor subsystem 321.

Figure 4:
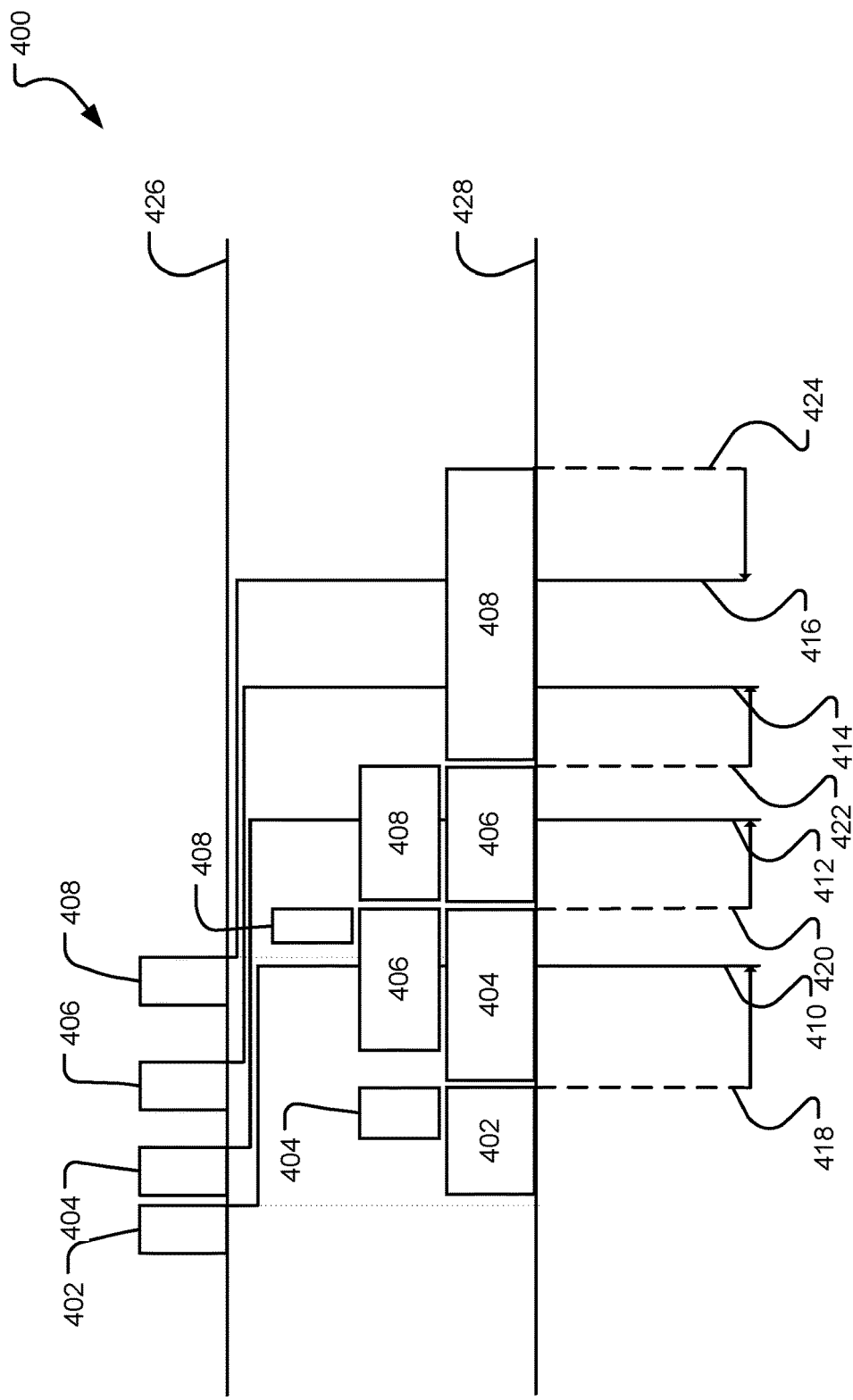
FIG. 4 illustrates an example tracked workload processor timeline.

FIG. 4 illustrates an example graphics workload processor timeline 400. The graphics workload processor timeline 400 includes graphics workloads 402, 404, 406, and 408. Each of the graphics workloads 402, 404, 406, and 408 are tracked graphics workloads. A CPU timeline 426 shows when the graphics workloads 402, 404, 406, and 408 were communicated to a GPU. A GPU timeline 428 shows the timeline for execution of the graphics workloads 402, 404, 406, and 408. Completion deadlines 410, 412, 414, and 416 along the GPU timeline 428 correspond to the graphics workloads 402, 404, 406, and 408. The GPU timeline 428 also shows when execution of the graphics workloads 402, 404, 406, and 408 is actually completed. For example, execution of the graphics workload 402 is completed at an actual completion time 418. Similarly, execution of the graphics workload 408 is completed at an actual completion time 424, the execution of the graphics workload 404 is completed at an actual completion time 420, and the execution of the graphics workload 406 is completed at an actual completion time 422.

A workload tracker module located within the operating system power management module may receive the actual completion time for tracked graphics workloads and use the information over time to update a performance model used to generate processor performance adjustments. For example, the graphics workload 402 has an actual completion time 418 before its completion deadline 410. This may indicate that graphics workloads with intent tags similar to the graphics workload 402 may be executed at a lower frequency to save power. Accordingly, the performance model may be updated to reflect a processor performance adjustment to a lower frequency for graphics workloads with the same intent tags or completion deadlines as the graphics workload 402. Similarly, the graphics workload 408 has an actual completion time 424 after its completion deadline 416. Accordingly, the performance model may be updated to reflect a processor performance adjustment to a higher frequency for graphics workloads with the same intent tags or completion deadlines as the graphics workload 408.

In other implementations, the workload tracker module may return actual completion time for tracked workloads back to the application that originally sent the graphics workload. The application may then update completion deadline information based on a more accurate assessment of execution time for the graphics workload. Accordingly, the completion deadline information sent by the application to the operating system may be more accurate over time.

Figure 5:
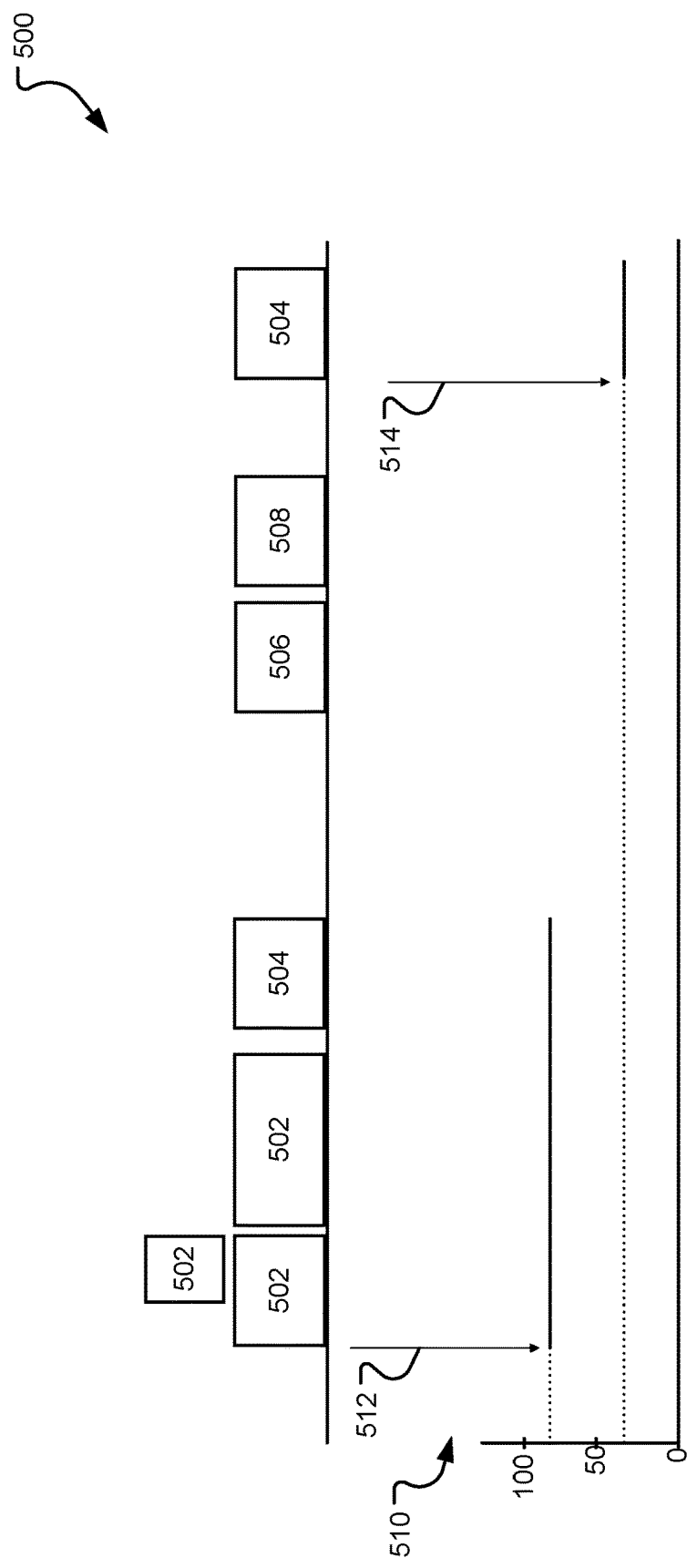
FIG. 5 illustrates a timeline for two types of tracked workloads, $T_1$ and $T_2$, and other untracked workloads, each in its own context.

FIG. 5 illustrates a timeline 500 for two types of tracked graphics workloads 502 and 504. The timeline 500 also includes untracked graphics workloads 506 and 508. An EPL graph 510 shows the EPL of a processor during the execution of the tracked graphics workloads 502 and 504 and the untracked graphics workloads 506 and 508. In one implementation, the EPL is an integer between 0 and 100, where 0 indicates that the GPU 121 should optimize its frequency for energy savings (lowest frequency) and where 100 indicates that the processor should optimize its frequency for speed and performance (highest frequency). In other implementations, the EPL is another variable proportional to processor performance speed. The operating system sets the EPL in response to a processor performance adjustment calculated for the tracked graphics workloads 502 and 504. For the untracked graphics workloads 506 and 508, the processor uses its own algorithms or methods to determine the frequency for execution, and, accordingly, the operating system does not set an EPL for untracked workloads.

In FIG. 5, the EPL for the tracked workload 502 is set at 80, while the EPL for the tracked workload 504 is set at 30. At a time 512 when the tracked workload 502 begins executing, the operating system sets the EPL to 80. Additionally, some of the tracked workload 504 may be executed while the EPL is set to 80. When the untracked workloads 506 and 508 are executed, the operating system does not set the EPL. When execution of the untracked workloads 506 and 508 is complete, the operating system sets the EPL to 30 at a time 514 until the execution of the tracked workload 504 is completed.

Figure 6:
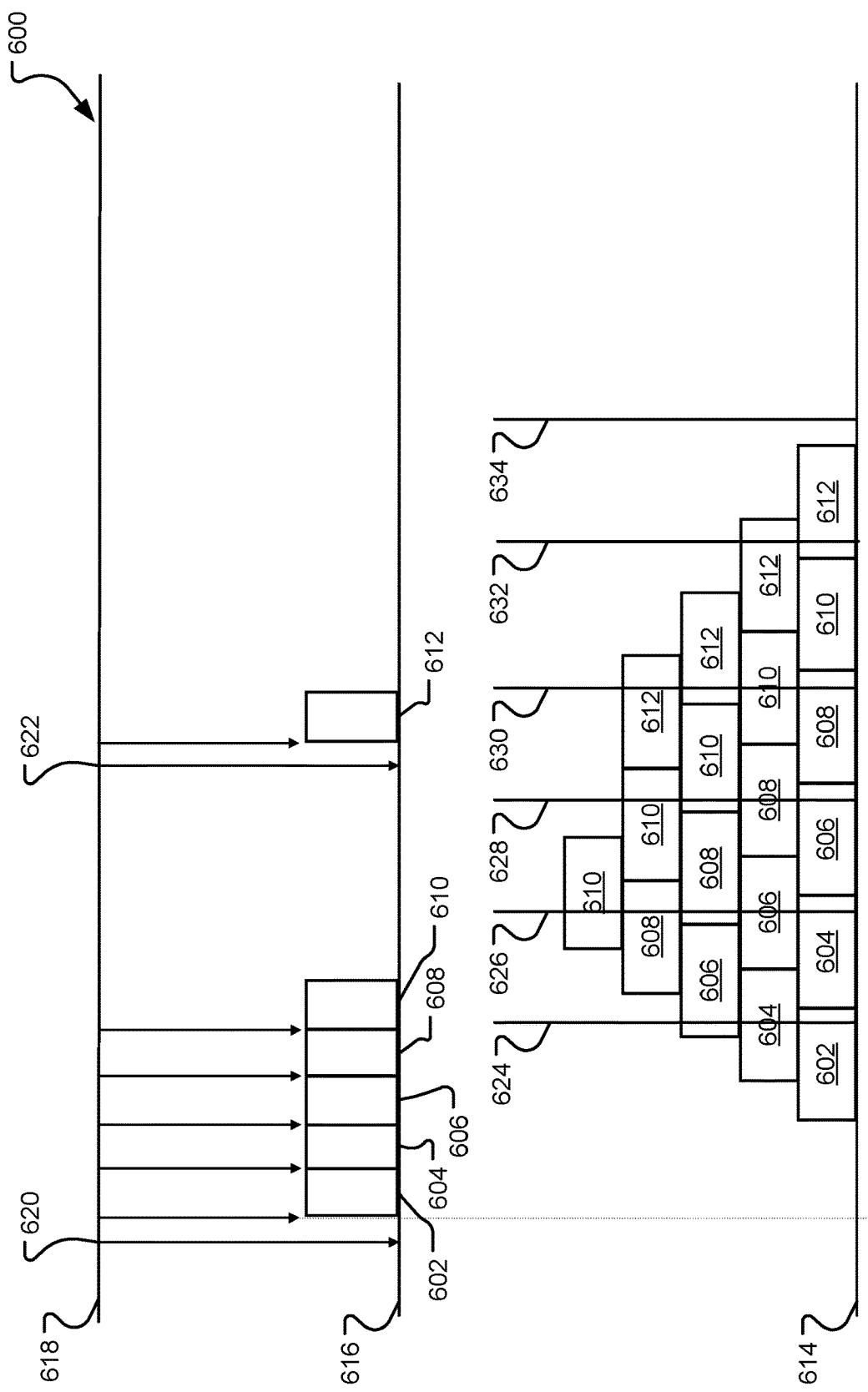
FIG. 6 illustrates a sequence of tracked workloads in the same context.

FIG. 6 illustrates a sequence 600 of tracked graphics workloads with the same context. In another example, an application submits a sequence of tracked graphics workloads 602, 604, 606, 608, 610, and 612. Because the tracked graphics workloads 602, 604, 606, 608, 610 and 612 have the same context, the tracked graphics workloads 602, 604, 606, 608, 610, and 612 are received with the same intent tag indicating the same performance intent for each of the tracked graphics workloads 602, 604, 606, 608, 610, and 612. A GPU execution timeline 614 shows the execution time for the tracked graphics workloads 602, 604, 606, 608, 610, and 612. A GPU submission timeline 616 shows when the tracked graphics workloads 602, 604, 606, 608, 610, and 612, along with EPL settings 620 and 622 are received by the GPU for execution. A CPU timeline 618 shows when the tracked graphics workloads 602, 604, 606, 608, 610, and 612, along with EPL settings 620 and 622 are submitted by the CPU to the GPU for execution.

As shown in FIG. 6, the CPU originally sets 620 the EPL to 60 for the tracked graphics workloads 602, 604, 606, 608, 610, and 612. This EPL setting may be based on an initial condition or a performance model of historical data gathered by a tracking module in the CPU. When the GPU executed the tracked graphics workloads 602, 604, and 606, the execution of the tracked graphics workloads 602, 604, and 606 are not completed by the completion deadlines 624, 626, and 628 of the tracked graphics workloads 602, 604, and 606. This information is returned to the CPU. In response, the CPU may modify the EPL settings by setting 622 the EPL to 70 before the execution of the tracked graphics workloads 608, 610, and 612 is completed. As a result of the updated EPL, the frequency of the GPU is increased and the tracked graphics workloads 608, 610, and 612 are executed slightly faster. While the tracked graphics workload 608 still misses the deadline 630, the execution of the tracked graphics workloads 610 and 612 is complete before execution deadlines 632 and 634 of the tracked graphics workloads 610 and 612.

Figure 7:
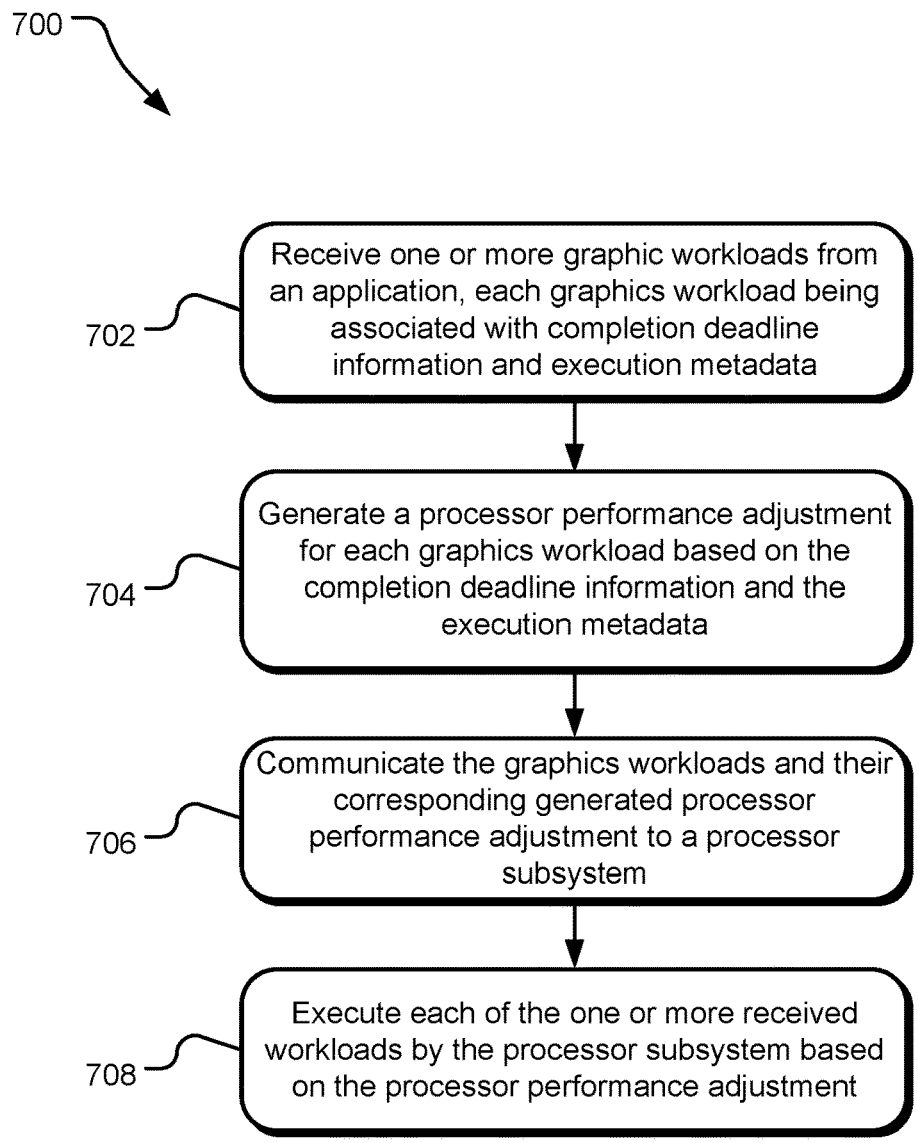
FIG. 7 illustrates example operations for dynamic processor power management.

FIG. 7 illustrates example operations 700 for dynamic processor power management. A receiving operation 702 receives one or more graphics workloads from an application. Each graphics workload received during the receiving operation 702 is associated with completion deadline information and execution metadata. Completion deadline information may be information used to calculate a completion deadline for execution of the graphics workload. In some implementations, the completion deadline information is the completion deadline itself. In other implementations, the completion deadline information may be, for example, an execution start time and an estimated elapsed execution time for the graphics workload.

In one implementation, the execution metadata is an intent tag. The intent tag indicates a performance intent for the graphics workload. A performance intent provides guidelines about the power needed to process the graphics workload, the payload signature of the graphics workload, or the context of the graphics workload. A payload signature of a graphics workload may be, for example, information indicating that the graphics workload is a short burst payload, a periodic payload, or a power saving payload. The intent tag may also be used to distinguish between tracked graphics workloads and untracked graphics workloads. In other implementations, the execution metadata may be, for example, execution time variability, priority metadata, or other metadata.

A generating operation 704 generates a processor performance adjustment for each graphics workload based on the completion deadline information and the execution metadata. In one implementation, the processor performance adjustment is generated based on a performance model. In some implementations, the performance model is a table including processor performance adjustments corresponding to a variety of combinations of intent tags and completion deadline information. By looking up the combination of the received intent tag and the received deadline information, the operating system power management module may generate an appropriate processor performance adjustment. In other implementations, the performance model may be, for example, a formula used to generate a processor performance adjustment based on the received intent tag and the received completion deadline information.

A communicating operation 706 communicates the graphics workloads and their corresponding generated processor performance adjustment to a processor subsystem. The processor subsystem used the generated processor performance adjustment to adjust the operating frequency of the processor subsystem so that the graphics workload may be executed by the performance deadline without using too much power. In some implementations, the processor subsystem further tracks when execution of the graphics workload was actually completed and returns that information, along with the original completion deadline to update the performance model. An executing operation 708 executed each of the one or more received workloads by the processor subsystem based on the processor performance adjustment.

Figure 8:
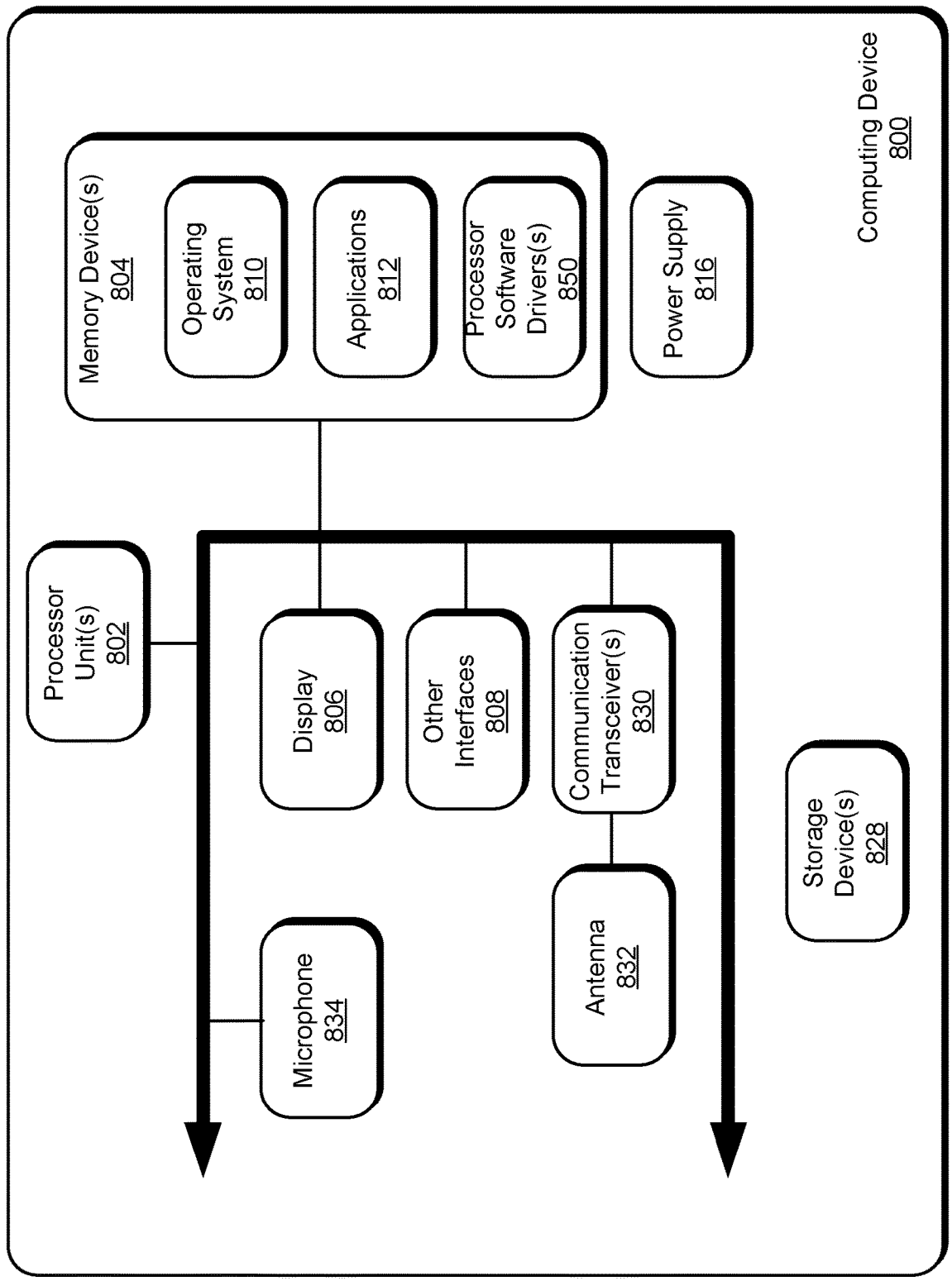
FIG. 8 illustrates an example computing device for use in dynamic processor power management.

FIG. 8 illustrates an example computing device for use in dynamic processor power management, including an example schematic of a computing device 800 configured to perform dynaminc processor power management. The computing device 800 includes one or more processor units 802, one or more memory devices 804, a display 806 (e.g., a touchscreen display or lights), a microphone 834, and other interfaces 808 (e.g., buttons). The memory device(s) 804 generally includes either or both of volatile memory (e.g., RAM) and non-volatile memory (e.g., flash memory). An operating system 810, such as the Microsoft Windows® operating system or the Microsoft Windows® Mobile operating system, resides in the memory 804 and is executed by the processor unit(s) 802, although it should be understood that other operating systems may be employed.

One or more applications 812 may be loaded in the memory device(s) 804 and executed on the operating system 810 by the processor unit(s) 802. One or more processor software drivers 850 is also loaded into the memory device(s) 804 and executed by the processor unit(s) 802. The computing device 800 includes a power supply 816, which is powered by one or more batteries or other power sources and which provides power to other components of the computing device 800. The power supply 816 may also be connected to an external power source that overrides or recharges the built-in batteries or other power sources.

The computing device 800 includes one or more communication transceivers 830 and an antenna 832 to provide network connectivity (e.g., a mobile phone network, Wi-Fi®, and BlueTooth®). The computing device 800 may also include various other components, such as a positioning system (e.g., a global positioning satellite transceiver), one or more accelerometers, one or more cameras, an audio interface (e.g., a microphone, an audio amplifier and speaker and/or audio jack), and one or more additional storage device(s) 828. Other configurations may also be employed.

In an example implementation, an operating system 810, one or more processor software drivers 850, various applications 812, and other modules and services may be embodied by instructions stored in the memory device(s) 804 and/or storage device(s) 828 and processed by the processing unit(s) 802. Heuristical data, workload start and completion times, start deadlines, completion deadlines, workload durations, workload submit times, intent tags, and other data may be stored in memory device(s) 804 and/or storage device(s) 828 as persistent datastores.

The computing device 800 may include a variety of tangible computer-readable storage media and intangible computer-readable communication signals, or alternatively, tangible processor-readable storage media and intangible processor-readable communication signals. Tangible computer-readable storage and tangible processor-readable storage can be embodied by any available media that can be accessed by the computing device 800 and includes both volatile and nonvolatile storage media, removable and non-removable storage media. Tangible computer-readable/processor-readable storage media excludes intangible communications signals and includes volatile and nonvolatile, removable and non-removable storage media implemented in any method or technology for storage of information such as computer/processor readable instructions, data structures, program modules or other data. Tangible computer-readable/processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can beaccessed by the computing device 800. In contrast to tangible computer-readable/processor-readable storage media, intangible computer-readable/processor-readable communication signals may embody computer/processor readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

An example method is provided, including receiving one or more workloads from an application. Each of the one or more workloads is associated with completion deadline information and execution metadata representing execution guidance for the workload. The method further includes generating a processor performance adjustment for each of the one or more workloads. The processor performance adjustment is based on the completion deadline information and the execution metadata for each of the one or more workloads. The method also includes communicating each of the one or more received workloads and its corresponding generated processor performance adjustment to a processor subsystem. Each of the processor performance adjustments instructs the processor subsystem on a processor adjustment to be implemented when executing the associated workload. The method further includes executing each of the one or more received workloads by the processor subsystem based on the processor performance adjustment.

An example method of any previous method is provided wherein execution of each received workload completes at an execution completion time and the method further includes updating a performance model based on the completion deadline and the execution completion time for each workload, responsive to completion of the execution of each workload. The method also further includes generating a new processor performance adjustment for a new workload using the updated performance model.

An example method of any previous method is provided wherein the execution metadata includes an intent tag providing execution guidance representing a performance intent associated with each workload.

An example method of any previous method is provided wherein the processor performance adjustment instructs the processor subsystem to adjust one or more frequencies in the processor subsystem.

An example method of any previous method is provided wherein the execution metadata includes workload prioritization metadata providing execution guidance associated with each workload and the generating operation includes evaluating the workload prioritization metadata associated with each workload, the processor performance adjustment instructing the processor subsystem with an adjusted execution order for the one or more workloads.

An example method of any previous method is provided wherein the completion deadline information includes a start time and an estimated elapsed execution time for one of the one or more workloads.

An example method of any previous method is provided wherein the completion deadline information includes a completion deadline for one of the one or more workloads.

An example system is provided. The example system includes means for receiving one or more workloads from an application. Each of the one or more workloads is associated with completion deadline information and execution metadata representing execution guidance for the workload. The example system further includes means for generating a processor performance adjustment for each of the one or more workloads. The processor performance adjustment is based on the completion deadline information and the execution metadata for each of the one or more workloads. The example system also includes means for communicating each of the one or more received workloads and its corresponding generated processor performance adjustment to a processor subsystem. Each of the processor performance adjustments instructs the processor subsystem on a processor adjustment to be implemented when executing the associated workload. The example system also includes means for executing each of the one or more received workloads by the processor subsystem based on the processor performance adjustment.

An example system of any preceding system is provided, wherein execution of each received workload completes at an execution completion time and the example system includes means for updating a performance model based on the completion deadline and the execution completion time for each workload, responsive to completion of the execution of each workload. The example system further includes means for generating a new processor performance adjustment for a new workload using the updated performance model.

An example system of any preceding system is provided, where the execution metadata includes an intent tag providing execution guidance representing a performance intent associated with each workload.

An example system of any preceding system is provided, where the execution metadata includes workload prioritization metadata providing execution guidance associated with each workload. The example system further includes means for evaluating the workload prioritization metadata associated with each workload. The processor performance adjustment instructs the processor subsystem with an adjusted execution order for the one or more workloads.

An example system of any preceding system is provided, where the completion deadline information includes a start time and an estimated elapsed execution time for one of the one or more workloads.

An example system of any preceding system is provided, where the completion deadline information includes a completion deadline for one of the one or more workloads.

An example computing device is provided. The example computing device includes one or more processors and an operating system application interface executing on the one or more processors. The operating system application interface is configured to receive one or more workloads from an application. Each of the one or more workloads are associated with completion deadline information and execution metadata representing execution guidance for the workload. An operating system power management module executes on the one or more processors and is configured to generate a processor performance adjustment based on the completion deadline information and the execution metadata for each of the one or more workloads. The operating system power management module is further configured to communicate each of the one or more received workloads and its corresponding generated processor performance adjustment to a processor subsystem. Each of the processor performance adjustments instructs the processor subsystem on a processor adjustment to be implemented when executing the associated workload. The operating system power management module is further configured to execute each of the one or more received workloads by the processor subsystem based on the processor performance adjustment.

An example computing device of any previous computing device is presented, where execution of each received workload completes at an execution time, and the operating system power management module is further configured to update a performance model based on the completion deadline and the execution completion time for each workload, responsive to completion of processor execution of each workload. The operating system power management module is further configured to generate a new processor performance adjustment for a new workload using the updated performance model.

An example computing device of any previous computing device is presented, where the execution metadata includes an intent tag providing execution guidance representing a performance intent associated with each workload.

An example computing device of any previous computing device is presented, where the processor performance adjustment instructs the processor subsystem to adjust one or more frequencies in the processor subsystem.

An example computing device of any previous computing device is presented, where the execution metadata includes workload prioritization metadata providing execution guidance associated with each workload and the operating system power management module is further configured to evaluate the workload prioritization metadata associated with each workload, the processor performance adjustment instructing the processor subsystem with an adjusted execution order for the one or more workloads.

An example computing device of any previous computing device is presented, where the completion deadline information includes a start time and an estimated elapsed execution time for one of the one or more workloads.

An example computing device of any previous computing device is presented, where the completion deadline information includes a completion deadline for one of the one or more workloads.

Example one or more tangible processor-readable storage media are embodied with instructions for executing on one or more processors and circuits of a computing device a process including receiving one or more workloads from an application. Each of the one or more workloads is associated with completion deadline information and execution metadata representing execution guidance for the workload. The process further includes generating a processor performance adjustment for each of the one or more workloads using a performance model providing the processor performance adjustment based on the completion deadline information and the execution metadata for each of the one or more workloads. The process also includes communicating each of the one or more received workloads and its corresponding generated processor performance adjustment to a processor subsystem. Each of the processor performance adjustments instructs the processor subsystem on a processor adjustment to be implemented when executing the associated workload. The process also includes executing each of the one or more received workloads by the processor subsystem based on the processor performance adjustment.

Another example one or more tangible processor-readable storage media are embodied with instructions for executing on one or more processors and circuits of a device a process of any preceding process wherein execution of each received workload completes at an execution completion time and the process further includes updating a performance model based on the completion deadline, and a completion time for each workload, responsive to completion of processor execution of each workload and generating a new processor performance adjustment for a new workload using the updated performance model.

Another example one or more tangible processor-readable storage media are embodied with instructions for executing on one or more processors and circuits of a device a process of any preceding process wherein the processor performance adjustment instructs the processor subsystem to adjust one or more frequencies in the processor subsystem.

Another example one or more tangible processor-readable storage media are embodied with instructions for executing on one or more processors and circuits of a device a process of any preceding process wherein the execution metadata includes workload prioritization metadata providing execution guidance associated with each workload. The process further includes evaluating the workload prioritization metadata associated with each workload, the processor performance adjustment instructing the processor subsystem with an adjusted execution order for the one or more workloads.

Another example one or more tangible processor-readable storage media are embodied with instructions for executing on one or more processors and circuits of a device a process of any preceding process wherein the completion deadline information includes a completion deadline for one of the one or more workloads.

Another example one or more tangible processor-readable storage media are embodied with instructions for executing on one or more processors and circuits of a device a process of any preceding process wherein the completion deadline information includes a start time and an estimated elapsed execution time for one of the one or more workloads.

Some embodiments may comprise an article of manufacture. An article of manufacture may comprise a tangible computer-readable/processor-readable storage medium to store logic. Examples of such a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer/processor program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

What is claimed is:

1. A method comprising:
receiving in an operating system one or more workloads from an application, each of the one or more workloads being associated with completion deadline information and execution metadata representing execution guidance for the workload;
generating in the operating system a processor performance adjustment for each of the one or more workloads, the processor performance adjustment based on the completion deadline information and the execution metadata for each of the one or more workloads;
communicating from the operating system each of the one or more received workloads and its corresponding generated processor performance adjustment to a processor subsystem, each of the processor performance adjustments instructing the processor subsystem on a processor adjustment to be implemented when executing the associated workload;
executing each of the one or more received workloads by the processor subsystem based on the processor performance adjustment;
updating a performance model executed by an operating system power management layer in the operating system based on the completion deadline information for each workload, the update being responsive to completion of execution of each workload; and
generating a new processor performance adjustment in the operating system for a new workload using the updated performance model.

2. The method of claim 1 wherein execution of each received workload completes at an execution completion time and the operation of updating a performance model executed by an operating system power management layer in the operating system is also based on the execution completion time for each workload.

3. The method of claim 1 wherein the execution metadata includes an intent tag providing execution guidance representing a performance intent associated with each workload.

4. The method of claim 1 wherein the processor performance adjustment instructs the processor subsystem to adjust one or more frequencies in the processor subsystem.

5. The method of claim 1 wherein the execution metadata includes workload prioritization metadata providing execution guidance associated with each workload and the generating operation comprises:
evaluating the workload prioritization metadata associated with each workload, the processor performance adjustment instructing the processor subsystem with an adjusted execution order for the one or more workloads.

6. The method of claim 1 wherein the completion deadline information includes a start time and an estimated elapsed execution time for one of the one or more workloads.

7. The method of claim 1 wherein the completion deadline information includes a completion deadline for one of the one or more workloads.

8. The method of claim 1, further comprising:
designating, in the operating system, one or more of the received workloads as a tracked workload; and
receiving, in the operating system, actual completion time of the one or more tracked workloads from the processor subsystem, responsive to completion of the tracked workload by the processor subsystem.

9. The method of claim 8, further comprising:
updating a performance model executed by an operating system power management layer in the operating system based on an execution completion time for each of the one or more tracked workloads, responsive to receiving the actual completion time of each of the one or more tracked workloads.

10. A computing device comprising:
one or more processors;
an operating system application interface in an operating system executing on the one or more processors and configured to receive one or more workloads from an application, each of the one or more workloads being associated with completion deadline information and execution metadata representing execution guidance for the workload; and
an operating system power management module in the operating system executing on the one or more processors and configured to:
generate a processor performance adjustment in the operating system power management module for each of the one or more workloads providing the processor performance adjustment based on the completion deadline information and the execution metadata for each of the one or more workloads,
communicate each of the one or more received workloads and its corresponding generated processor performance adjustment from the operating system to a processor subsystem, each of the processor performance adjustments instructing the processor subsystem on a processor adjustment to be implemented when executing the associated workload,
execute each of the one or more received workloads by the processor subsystem based on the processor performance adjustment;
update a performance model executed by an operating system power management layer in the operating system based on the completion deadline information for each workload, the update being responsive to completion of execution of each workload; and
generate a new processor performance adjustment in the operating system for a new workload using the updated performance model.

11. The computing device of claim 10, wherein execution of each received workload completes at an execution completion time, and the performance model is also updated based on the execution completion time for each workload.

12. The computing device of claim 10 wherein the execution metadata includes an intent tag providing execution guidance representing a performance intent associated with each workload.

13. The computing device of claim 10, wherein the processor performance adjustment instructs the processor subsystem to adjust one or more frequencies in the processor subsystem.

14. The computing device of claim 10, wherein the execution metadata includes workload prioritization metadata providing execution guidance associated with each workload and the operating system power management module is further configured to evaluate the workload prioritization metadata associated with each workload, the processor performance adjustment instructing the processor subsystem with an adjusted execution order for the one or more workloads.

15. The computing device of claim 10, wherein the completion deadline information includes a start time and an estimated elapsed execution time for one of the one or more workloads.

16. The computing device of claim 10, wherein the completion deadline information includes a completion deadline for one of the one or more workloads.

17. One or more tangible processor-readable storage media embodied with instructions for executing on one or more processors and circuits of a computing device a process comprising:

receiving in an operating system one or more workloads from an application, each of the one or more workloads being associated with completion deadline information and execution metadata representing execution guidance for the workload;

generating in the operating system a processor performance adjustment for each of the one or more workloads using a performance model providing the processor performance adjustment based on the completion deadline information and the execution metadata for each of the one or more workloads; and communicating from the operating system each of the one or more received workloads and its corresponding generated processor performance adjustment to a processor subsystem, each of the processor performance adjustments instructing the processor subsystem on a processor adjustment to be implemented when executing the associated workload;

executing each of the one or more received workloads by the processor subsystem based on the processor performance adjustment;

updating a performance model executed by an operating system power management layer in the operating system based on the completion deadline information for each workload, the update being responsive to completion of execution of each workload; and generating a new processor performance adjustment in the operating system for a new workload using the updated performance model.

18. The one or more tangible processor-readable storage media of claim 17, wherein execution of each received workload completes at an execution completion time and the operation of updating a performance model executed by an operating system power management layer in the operating system is also based on the execution completion time for each workload.

19. The one or more tangible processor-readable storage media of claim 17 wherein the processor performance adjustment instructs the processor subsystem to adjust one or more frequencies in the processor subsystem.

20. The one or more tangible processor-readable storage media of claim 17 wherein the execution metadata includes workload prioritization metadata providing execution guidance associated with each workload and the process further comprises:

evaluating the workload prioritization metadata associated with each workload, the processor performance adjustment instructing the processor subsystem with an adjusted execution order for the one or more workloads.

21. The one or more tangible processor-readable storage media of claim 17 wherein the completion deadline information includes a completion deadline for one of the one or more workloads.

22. The one or more tangible processor-readable storage media of claim 17 wherein the completion deadline information includes a start time and an estimated elapsed execution time for one of the one or more workloads.

* * * * *